(12) United States Patent
Mays et al.

(10) Patent No.: US 9,810,542 B2
(45) Date of Patent: Nov. 7, 2017

(54) VEHICLE PARKING SYSTEM

(71) Applicant: OMNITRACS, LLC, Dallas, TX (US)

(72) Inventors: Wesley M. Mays, Coppell, TX (US); Richard Glasmann, Dallas, TX (US)

(73) Assignee: Omnitracs, LLC, Dallas, TX (US)

( * ) Notice: Subject to any disclaimer, the term of this patent is extended or adjusted under 35 U.S.C. 154(b) by 42 days.

(21) Appl. No.: 15/011,182

(22) Filed: Jan. 29, 2016

(65) Prior Publication Data

US 2017/0219361 A1    Aug. 3, 2017

(51) Int. Cl.
*G01C 21/34* (2006.01)
*G06Q 20/32* (2012.01)
(Continued)

(52) U.S. Cl.
CPC ............ *G01C 21/34* (2013.01); *G01M 17/00* (2013.01); *G05D 1/00* (2013.01); *G06Q 10/06* (2013.01); *G06Q 10/063114* (2013.01); *G06Q 20/32* (2013.01); *G06Q 20/3226* (2013.01); *G06Q 20/40* (2013.01); *G06Q 20/405* (2013.01); *G06Q 50/06* (2013.01); *G06Q 50/30* (2013.01); *G07C 5/008* (2013.01); *G07C 5/085* (2013.01); *G08G 1/056* (2013.01); *G08G 1/123* (2013.01); *G08G 1/205* (2013.01); *G08G 1/207* (2013.01)

(58) Field of Classification Search
CPC ........ G08G 1/123; G08G 1/056; G08G 1/207; G07C 5/08; G07C 5/00; G07C 5/085; G06Q 10/06; G06Q 10/063114; G06Q 40/00; G06Q 20/32; G06Q 20/40; G06Q 20/405; G06Q 50/06; G06Q 20/3226; G06Q 50/30; G01S 19/42; G01C 21/34; G09B 19/16; G09B 5/00; G09B 19/167; G06F 17/00; G06F 19/00
See application file for complete search history.

(56) References Cited

U.S. PATENT DOCUMENTS 7,117,075 B1 *  10/2006  Larschan ............... G06Q 10/06
                                                    340/438
9,608,756 B2 *   3/2017  Chang .................... H04J 14/02
(Continued)

FOREIGN PATENT DOCUMENTS

| RU | 2 271 573 C1 | 3/2006 |
|---|---|---|
| WO | WO 20081083749 | 7/2008 |
| WO | WO 2009/156428 A1 | 12/2009 |

OTHER PUBLICATIONS

International Search Report dated Aug. 3, 2017 issed in International Patent Application No. PCT/US2017/015508.
(Continued)

*Primary Examiner* — Behrang Badii
(74) *Attorney, Agent, or Firm* — Arent Fox LLP (57) ABSTRACT

Aspects of the present disclosure are generally related to one or more systems, methods, and devices for forecasting the likelihood of locating available parking spaces at various remote locations, and navigating a vehicle to the available parking space. In some examples, aspects of the present disclosure may utilize a variety of data sources (e.g., historical data, surveyed data, and real-time parking availability data) in order to predict the likelihood of locating the available parking space within the confines of an available hours of service (HOS) requirement of a driver of the vehicle.

20 Claims, 6 Drawing Sheets

(51) Int. Cl.

*G06Q 10/06* (2012.01)
*G06Q 20/40* (2012.01)
*G08G 1/123* (2006.01)
*G05D 1/00* (2006.01)
*G06Q 50/06* (2012.01)
*G06Q 50/30* (2012.01)
*G08G 1/056* (2006.01)
*G07C 5/00* (2006.01)
*G08G 1/00* (2006.01)
*G01M 17/00* (2006.01)
*G07C 5/08* (2006.01)

(56) References Cited

U.S. PATENT DOCUMENTS

| | | | |
|---|---|---|---|
| 2005/0280555 A1 | 12/2005 | Warner, IV | |
| 2007/0050108 A1* | 3/2007 | Larschan | G07C 5/085 |
| | | | 701/33.4 |
| 2016/0011001 A1* | 1/2016 | Emory | G01C 21/3492 |
| | | | 701/465 |
| 2016/0247153 A1* | 8/2016 | Lesesky | G06Q 20/405 |

OTHER PUBLICATIONS

Kak zabrinirovat parkovku uv Sheremetievo? [online] Sep. 9, 2015 [retrieved on Jul. 7, 2017]. Retrieved from the Internet: <URL: http://nenovostry.ru/kak-zabronirovat-parkovku-v-sheremet-evo. html>, p. 1, 2.

\* cited by examiner

VEHICLE PARKING SYSTEM

BACKGROUND

In recent decades, significant attention has been called to the issue of safety among truck drivers. In particular, the fact that many drivers may drive for long hours, and may thus be at a lowered sense of alertness, has contributed to a number of highway accidents and fatalities. Accordingly, such perception has led to legislation and regulations that seek to determine how much and how often a truck driver may drive, and dictate the amount and frequency of rest periods. Generally, in order to comply with the legislation and regulations, truck drivers maintain an accurate driver log that records time periods when the driver is on-duty and driving, on-duty but not driving, off-duty, and resting/sleeping. Based on such information, a driver may be able to determine his or her allowable hours of service (HOS) (e.g., a time value that the driver may be on-duty). In some examples, HOS rules may require a trucker to take a 30-minute rest after eight hours of driving, or to stop for a longer period after driving for 11 hours.

Accordingly, in complying with the HOS requirements, truck drivers often seek out convenient parking locations (e.g., authorized truck stops) in order to rest/sleep during the off-duty period. However, truck drivers are often faced with a critical shortage in available truck parking due to growth in commercial vehicle truck travel on the nation's roads. Particularly, the five-axle trucks that generally drive the nation's highways are difficult to park, and require spaces specifically designed for trucks. Inability to find a designated parking spot may result in the truck driver having to spend the night on road shoulders and exit ramps. As such, often truckers must guess when and where to stop, and if they are wrong, may face long distances to find the next location with dedicated legal parking. In some instances, given the unpredictability of traffic congestion, the trucker may be unable to reach the next location without violating the HOS requirements.

Thus, in many instances, a truck driver, in order to avoid the risks associated with not finding a convenient parking location, may prematurely stop (e.g., prior to the expiration of available HOS) at a first location that may have available parking. However, in doing so, the truck driver may not maximize his or her allowable HOS.

SUMMARY

Aspects of the present disclosure are generally related to one or more systems, methods, and devices for forecasting the likelihood of locating available parking spaces at various remote locations, and navigating the driver to the available parking space. In some examples, aspects of the present disclosure may utilize a variety of data sources (e.g., historical data, surveyed data, and real-time parking availability data) in order to predict the likelihood of locating an available parking space at a location that is within the confines of an available HOS requirement of the vehicle driver.

Accordingly, in some aspects, an analytics and navigation system of the present disclosure may maintain an active electronic driver log that collects information from driver inputs and/or one or more sensors associated with the vehicle to record time periods when the driver is on-duty and driving, on-duty but not driving, off-duty, and resting/sleeping in order to dynamically determine remaining HOS for a driver associated with a vehicle. In some examples, the analytics and navigation system may further utilize the remaining HOS information to calculate a distance that the vehicle can travel on a route to a final destination of the vehicle before expiration of the remaining HOS. In some examples, aspects of the present disclosure may calculate the distance based on consideration of factors such as traffic and/or weather conditions.

Upon calculating the distance that the vehicle may travel before the expiration of HOS associated with the driver, aspects of the present disclosure may identify a target resting destination (e.g., a region of predetermined radius). Accordingly, in some examples, the analytics and navigation system may determine the likelihood of locating available parking spaces at various intervals (e.g., every 2 miles) at the target resting destination such that the driver may reach the available parking location (e.g., designated truck stop) while maximizing the available HOS.

Aspects of the present disclosure include a method, apparatus, and a computer-readable medium for navigating a vehicle to one or more parking location candidates. In some aspects, the method, apparatus, and a computer-readable medium may comprise identifying a route for the vehicle to a destination and determining a remaining hours of service (HOS) for a driver associated with the vehicle. In some examples, features of the present disclosure may include calculating a distance that vehicle can travel on the route before expiration of the remaining HOS and identifying one or more parking location candidates for the vehicle at a target resting destination based on the calculated distance. Accordingly, the method, apparatus, and the computer-readable medium may be configured to navigate the vehicle to the one or more parking location candidates at the target resting destination.

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional element or action, and in which.

DETAILED DESCRIPTION

Various aspects will now be described with reference to the drawings. In the following description, for purposes of explanation, numerous specific details are set forth in order to provide a thorough understanding of one or more aspects. It should be understood, however, that such aspect(s) may be practiced without these specific details. Also, as used herein, the term "component" may be one of the parts that make up a device, may be hardware (e.g., a processor) or software (e.g., computer executable instructions or code stored on a computer-readable medium) or firmware (e.g., a combination of both), and may be divided into other components and/or distributed across one or more processors.

As discussed above, various legislations and regulations dictate how much and how often a truck driver may drive, and the amount and frequency the driver must rest (e.g., 30-minute rest after eight hours of driving, or to stop for a longer period after 11 hours of driving). Generally, truck drivers, in order to avoid the risks associated with not finding a convenient parking location, may prematurely stop (e.g., prior to the expiration of available HOS) at a first location that may have available parking. However, in doing so, the truck driver may not maximize their allowable HOS.

Aspects of the present disclosure remedy the above-identified problem by forecasting the likelihood of locating available parking spaces at various remote locations, and navigating the driver to the available parking space that is within the remaining available HOS of the driver. In some aspects of the present disclosure, a mobile computing device carried by the driver or located in a cab and/or trailer of a vehicle transporting a portable asset may aid the truck driver in managing the driver log information. In some examples, the mobile computing device may offer a user interface to the truck driver to allow the truck driver to enter and/or track the required driver log information to record the driver activity. Additionally or alternatively, the mobile computing device may automatically measure at least a portion of the driver log information (e.g., on-duty and driving, on-duty but not driving, off-duty, and resting/sleeping), for example, based on driver entered indications and a timer, and/or based a number of sensors that collect and report vehicle performance data to the mobile computing device. Additionally, the mobile computing device may thereby communicate the collected driver log information to a network management center (NMC), e.g., one or more network devices, for analysis.

Aspects of the present disclosure leverage the electronically collected information to aid the truck driver (via the mobile computing device) in identifying one or more available parking locations that may be reached within the confines of an available HOS of the driver. Particularly, the NMC, located remotely from the mobile computing device, may collect vehicle specific information, such as but not limited to the location of the vehicle, the final destination of the vehicle, the set of streets defining the route that the vehicle intends to traverse, and the on-duty/off-duty time periods associated with the driver of the vehicle. Additionally or alternatively, the NMC device may retrieve external information, such as but not limited to, traffic and/or weather conditions on the route that vehicle intends to traverse, to calculate an approximate distance that the vehicle may be able to travel prior to the expiration of the available HOS of the driver (e.g., calculated based on the on-duty/off-duty information received from the mobile computing device). Based on the collected information, the NMC device (that may be part of the analytics and navigation system) may utilize historical and/or surveyed data in conjunction with the above-identified information to provide the likelihood of locating one or more available parking spaces at various remote locations (e.g., remote from a current location of the vehicle) on the route within the available HOS of the driver, such that the driver may maximize the available HOS. In some examples, the term "surveyed data" may refer to information collected from one or more private companies that may make parking information available at their respective locations (e.g., via postings on websites that identify the facility capacity, number of spaces that have been reserved and/or are currently available). Thus, the NMC device may correlate the surveyed data against historical data (e.g., parking availability at the identified locations at specific dates and times) to calculate the likelihood of finding one or more available parking spaces at the time that the vehicle is estimated to reach the location (e.g., based on a vehicle speed, traffic along the route, etc.). In some aspects, the NMC device may further transmit navigation information to the mobile computing device in order to allow the mobile computing device to navigate the vehicle to an identified available parking location.

Figure 1:
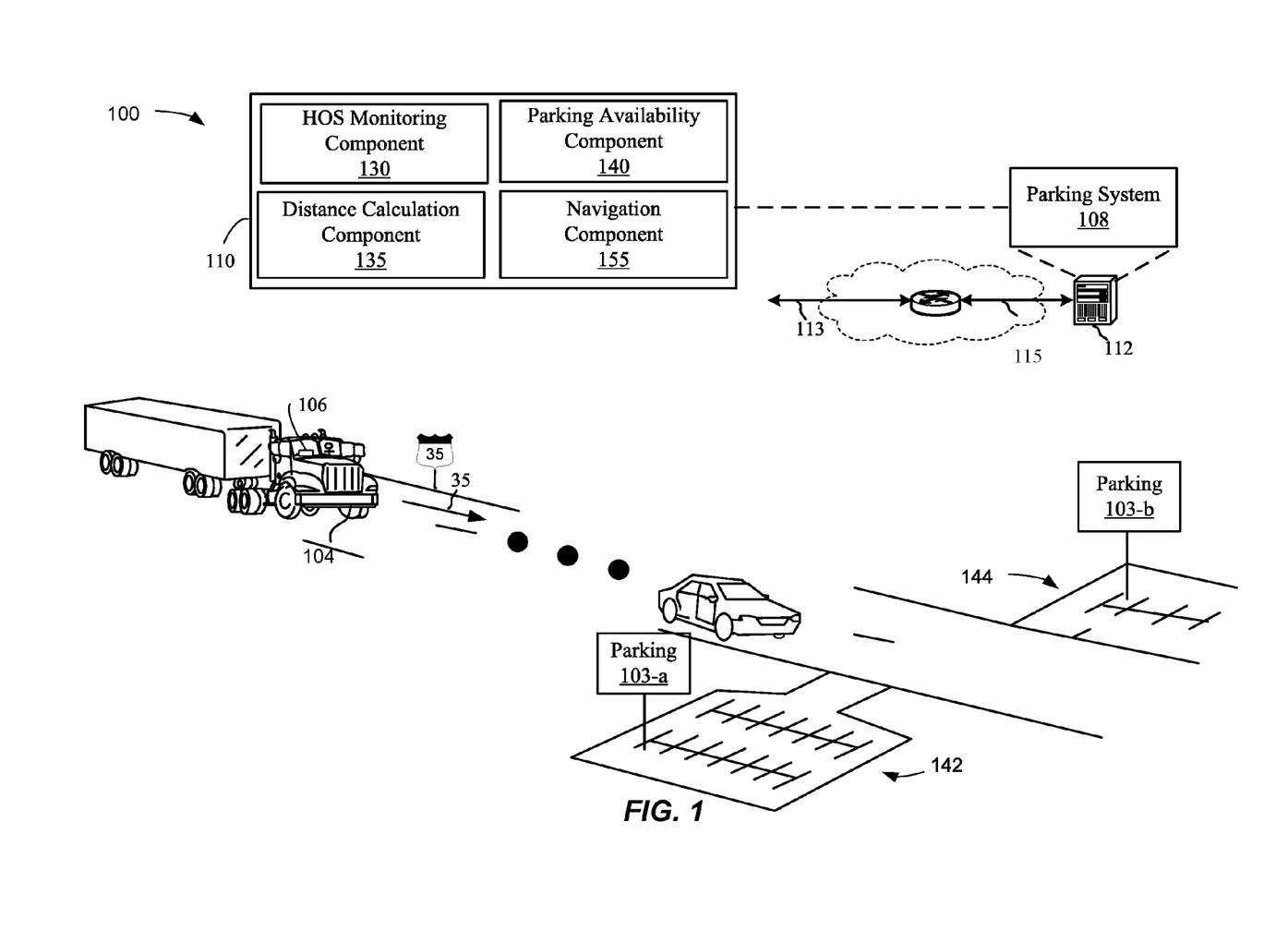
FIG. 1 illustrates a parking system implementing various aspects of the present disclosure.

FIG. 1 illustrates one example of a system 100 including a parking availability system and a navigation system in accordance with various aspects of the present disclosure that identify a likelihood of locating a parking space at a remote location based on historical and surveyed data, and that navigate the vehicle 104 to one or more available parking spaces 103.

In some examples, the wireless communication system 100 may include one or more fleet vehicles 104 travelling along a route 35, which may include a series of one or more roads and/or highways. The term "highway" may be associated with any public road, including, but not limited to interstate highways, freeways, autobahn, autoroute, etc. The one or more fleet vehicles 104 may be in wireless communication with a network device 112 via one or more communication networks (not shown). Specifically, the network device (e.g., NMC) 112 may be configured to communicate with one or more vehicles 104 via a mobile computing device 106 located on each vehicle 104 or associated with a driver of each vehicle 104. An example of an mobile computing device 106 includes, but is not limited to, a cell phone, a laptop computer, a tablet device, an MCP 50, an MCP 100, an MCP 110, an MCP 200, and a TT210 sold by Omnitracs, LLC of Dallas, Tex., a communication device associated with the Roadnet platform sold by Omnitracs, LLC of Dallas, Tex., a communication device associated with the XRS platform sold by Omnitracs, LLC of Dallas, Tex., or an intelligent vehicle gateway (IVG) device sold by Omnitracs, LLC of Dallas, Tex. Accordingly, the mobile computing device 106 and the network device 112 may exchange data via a wireless communication link (not shown) and/or a backhaul link 113 by utilizing one or more base stations, access points (APs), and/or satellite communications. The network device 112 may provide user authentication, access authorization, tracking, internet protocol (IP) connectivity, parking availability notification, and other access, routing, or mobility functions.

In some examples, the mobile computing device 106 associated with vehicle 104 may periodically (e.g., every 5 minutes) transmit vehicle specific information (e.g., one or any combination of location of the vehicle, the final destination of the vehicle, the route the vehicle is scheduled to traverse, available HOS of the driver of the vehicle, on-duty and off-duty periods of the driver, etc.) to the NMC 112. Based on the received information, the NMC 112, and more specifically the HOS monitoring component 130, may maintain an active log of remaining available HOS of the driver in order to aid in determining the distance that the vehicle 104 may travel within the remaining available HOS of the driver (e.g., on-duty driving and on-duty not driving) periods.

For example, a vehicle 104 traveling from Los Angeles, Calif. to Denver, Colo. may require approximately 15 hours to drive the 1,016 miles. However, due to HOS restrictions, a vehicle driver may be limited only to 11 hours of driving before an 8 hour mandated rest period. As such, in some aspects, the HOS monitoring component 130 may maintain a real-time driver log (e.g., by decrementing time from the available HOS) based on driver inputs and/or sensors associated with the vehicle 104 (e.g., sensors associated with the engine or global positioning system (GPS)) to determine the remaining available HOS for the driver. For example, HOS monitoring component 130 may infer that the vehicle driver is on-duty and driving if the HOS monitoring component 130 receives information from engine sensors and/or GPS sensors that the vehicle 104 is moving.

Accordingly, in some aspects, as the vehicle 104 may pass Las Vegas, Nev. in route to the final destination of Denver, Colo. with 5 hours of available HOS remaining for the day, for example, the driver may forced to decide whether to stop at the first available parking locations near Las Vegas, Nev. or risk not finding an available parking space in the mountains on the way to Denver, Colo. In such a scenario, the driver may query the mobile computing device 106 to determine the available parking information along the remaining portion of the route to Denver, Colo. Accordingly, in some aspects, the mobile computing device 106 may transfer the vehicle information (e.g., current location of the vehicle 104, the final destination, the route) to the NMC 112, and more particularly to the parking system 108 of the NMC 112. It should be understood that the vehicle information may also be automatically and periodically transmitted to the NMC 112 without the interaction of the driver.

In some examples, the parking system 108 may include a distance calculation component 135 that may communicate with the HOS monitoring component 130 to calculate the distance (e.g., based on traffic congestion and weather conditions) that the vehicle 104 may be able to travel along the remaining route to Denver, Colo. before an expiration of the available HOS of the driver. Further, for example, the parking system 108 may include a parking availability component 140 that may communicate with the distance calculation component 135 to identify and/or predict available parking locations within a certain vicinity of the remaining portion of the route and within a certain vicinity of the distance calculated by the distance calculation component 135. For example, if the distance calculation component 135 determines that there are deteriorating weather conditions (e.g., rain, sleet, snow, etc.) along the remaining route, the distance calculation component 135 may deduce that the vehicle 104 may travel at lower-than-expected speeds (e.g., a speed less than a speed limit, or a speed less than a current average speed of other vehicles along the remaining portion of the route), and thus impact the calculated distance. Accordingly, in some aspects, the parking system 108, based on the calculated distance, also referred to as a target resting destination, may task the parking availability component 140 to identify one or more parking locations having one or more available parking spaces at various intervals near the calculated distance along the remaining portion of the route 35. For instance, parking availability component 140 may identify first parking space 103-$a$ at first parking location 142 along route 35 and a second parking space 103-$b$ at a second parking location 144 along route 35, where the first parking location 142 and the second parking location 144 are different. Further, for example, if the distance calculation component 135 determines that the vehicle 104 may be able to travel an additional 300 miles prior to expiration of the remaining available HOS of the driver, the parking availability component 140 may identify parking locations and likelihood of availability at the target resting destination (e.g., Salina, Utah that is 300 miles from Las Vegas, Nev.). Additionally or alternatively, the parking availability component 140 may identify one or more additional parking candidate destinations at various intervals within the predetermined threshold of the target resting destination (e.g., 60 mile threshold). Thus, in such a scenario, the parking availability component 140 may identify parking location candidates at the 300, 280, 260 and 240 mile distances from the current location (e.g., Las Vegas, Nev.) of vehicle 104.

In some aspects, the parking availability component 140 may identify both commercial parking locations (e.g., truck stops) and authorized non-commercial parking locations (e.g., retail parking lots that may be empty at night, state-sponsored rest stops, or farm land authorized by the owner). In some examples, the commercial parking location information may be obtained by the parking availability component 140 by surveying one or more vendor websites, for example, which may identify parking capacity, number of parking spaces currently occupied, number of parking spaces currently available, and/or number of parking spaces reserved for the timeframe that the vehicle 104 may reach the location of the parking location candidate. In other examples, the parking availability component 140 may also rely on historical information for one or more of the parking location candidates at the target resting destination to estimate a likelihood of parking availability. In yet further examples, the parking availability component 140 may be configured to reserve an available parking space at the parking location candidate without the interaction by the driver.

With respect to the authorized non-commercial parking locations, the parking availability component 140, in some examples, may leverage information gathered by vehicles that are part of system 100 and/or that are equipped with mobile computing device 106 devices to identify parking location candidates. Particularly, because a fleet may have hundreds or thousands of vehicles 104 in operation, each equipped with the mobile computing device 106 that may periodically transmit data and information to the NMC 112, the parking availability component 140 may be able to identify geographic areas or locations where a number of vehicles 104 generally congregate as potential non-commercial parking locations. For example, if the parking availability component 140 observes that during a certain periods of time (e.g., evening or night time), a number of vehicles 104 tend to idle at a certain location (e.g., retail parking lot), the parking availability component 140 may mark the identified location as a parking location candidate.

In some aspects, the parking availability component 140 may further verify the non-commercial potential parking location candidate by geo-fencing the location, and/or by comparing the location of the potential parking location candidate to known locations or geo-fenced areas that are not authorized for resting. For example, once the parking availability component 140 marks a particular location as a potential parking location candidate, the parking availability component 140 may further verify (via collaborative data) that the location where a number of trucks are observed to congregate is not a warehouse, distribution center, or another location that may not be authorized for a vehicle 104 to park while a driver seeks to rest. In some aspects, the parking availability component 140 may further include a confidence factor associated with the forecasting performed by parking system 108, where the confidence factor identifies the level of confidence that the system has the availability of parking. Thus, for example, if the parking availability component 140 identifies non-commercial potential parking location candidates having parking spaces based on observing a limited number (e.g., 2-5 times) of instances when other vehicles 104 have been historically observed to congregate, the parking availability component 140 may associate a relatively low level of confidence (or a relatively low confidence factor) with the predicted available parking space in fact existing and being available. Conversely, if the parking availability component 140 identifies the parking space based on high number of instances that the vehicles 104 have been historically observed in a particular location, the parking availability component 140 may associate a relative high level of confidence (or a relatively high confidence factor) in forecasting the availability of the parking space at the potential parking location candidate corresponding to the target resting destination. Thus, parking availability component 140 may report the level of confidence or confidence factor associated with each parking location candidate, and/or parking availability component 140 may direct vehicle 140 to a parking location candidate having a highest level of confidence or confidence factor, and/or parking availability component 140 may not consider directing vehicle 140 to a parking location candidate as a potential resting location unless the level of confidence or confidence factor satisfies a minimum confidence threshold value.

Additionally or alternatively, the navigation component 155 may be configured to transmit navigation information to the mobile computing device 106 in order to navigate the vehicle 104 to the identified parking location and/or available parking space.

Figure 2:
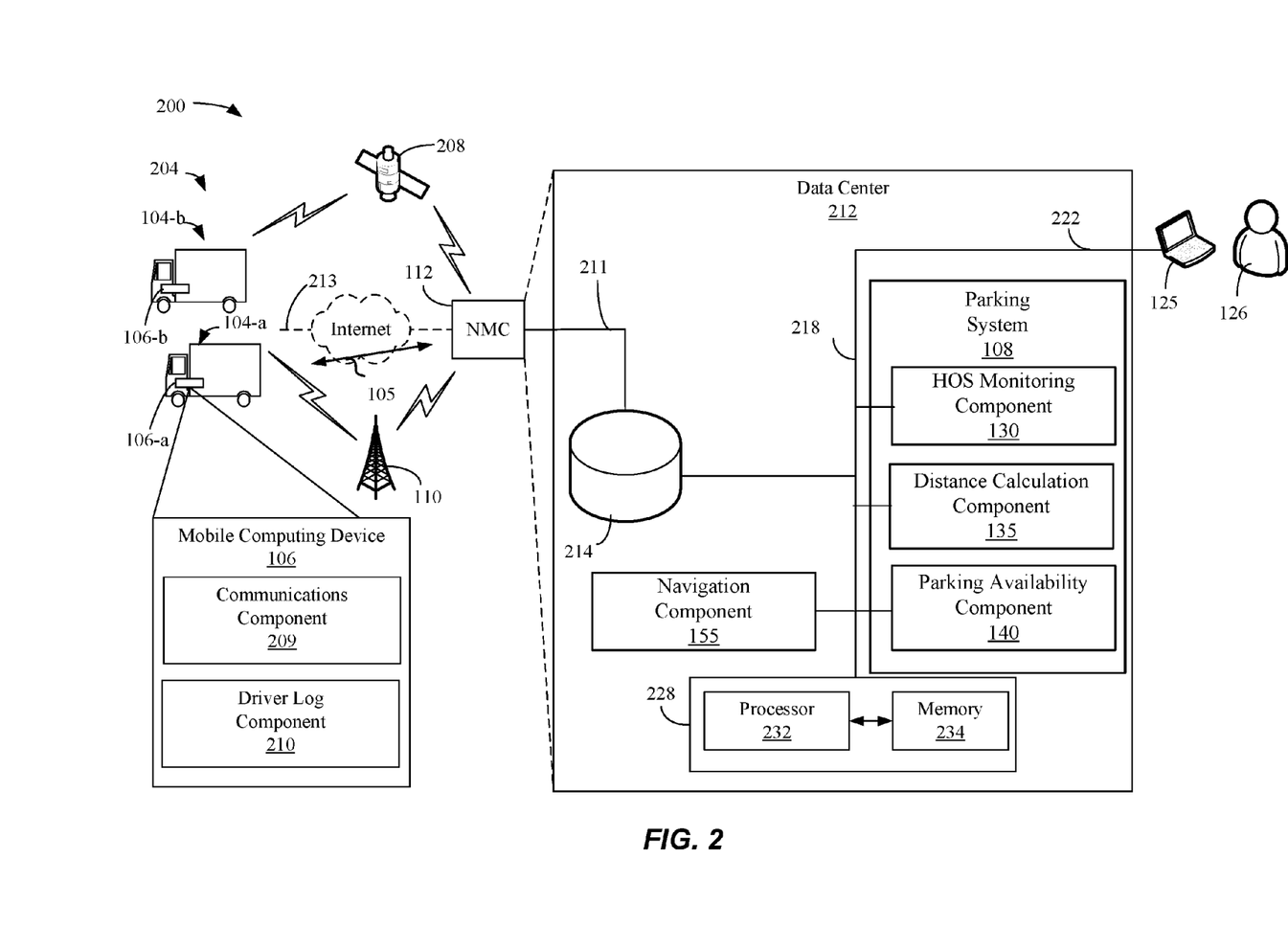
FIG. 2 is a functional block diagram of example elements of an aspect of a system in accordance with various aspects of the present disclosure.

Referring now to FIG. 2, in an aspect, a system 200 (e.g., a more detailed view of system 100 of FIG. 1) includes components for implementing parking availability forecasting capability as illustrated in FIG. 1 above.

In an aspect, system 200 can comprise a network management center (NMC) 112 configured to communicate with one or more vehicles 104 via the mobile computing device 106 located on each vehicle 104 or associated with the driver of each vehicle 104. The system 200 may include one or more fleets of vehicles 104, each fleet having at least one vehicle. Typically, a fleet could include as many tens, hundreds or thousands of vehicles. An example fleet 204 is illustrated as having two vehicles, 104-*a* and 104-*b*. Additional fleets (not shown) are contemplated, but not shown. In implementations, each mobile computing device 106 is configured to collect and transmit data associated with the operation of the vehicle 104 to the NMC 112. In some aspects, the mobile computing device 106 may include a communication component 209 configured to establish communication with NMC 112 and driver log component 210 for recording the driver's on-duty and off-duty periods based on driver inputs and/or one or more sensors associated with the vehicle 104.

In some implementations, mobile computing device 106 may include a processor configured to execute one or more aspects of the communication component 209 with external devices such as NMC 112 and/or terminal device 225 via a communication network. The mobile computing device 106 may also include a memory configured to store computer-readable code that may define all or part of the components 207 and also to store data associated with the components and/or mobile computing device 106. As such, in an aspect, processor and memory of mobile computing device 106 may be specially programmed to perform the functionality described herein. mobile computing device 106 may also include a user interface or display, a mobile application server, and a communications component 209 (e.g., including the one or more transceivers, and one or more of terrestrial and Wi-Fi modems, one or more antennae, a GPS component, and a satellite communications component).

As an example only, each vehicle 104 may be in bi-directional communication with NMC 112 over at least one communication channel. In the example shown in FIG. 2, each vehicle 104 is in bi-directional communication with the NMC 112 over at least one of a satellite-based communication system 208 or a terrestrial-based system 110 (e.g., a wireless communication system using a communication protocol/technology such as, but not limited to, GSM, CDMA, TDMA, WCDMA, EDGE, OFDM, GPRS, EV-DO, LTE, WiFi, Bluetooth, or, when the vehicle is stopped, via a wired connection 213 through the Internet). Depending on many factors, data may be exchanged with the vehicles 104 using one or both of the satellite communication system 208 and the terrestrial-based communication system 110.

In an aspect, many different types of data are collected and transferred from the vehicles 104 to the NMC 112. Examples of such data include, but are not limited to, vehicle performance data, driver performance data, critical events, messaging and position data, location delivery data, and many other types of data. All of the information that is communicated to and from the vehicles 104 may be processed via the NMC 112. The NMC 112 can be thought of as a data clearinghouse that receives all data that is transmitted to and received from the vehicles 104. Moreover, in an aspect, NMC 112 may include one or more back-end servers. Thus, in some aspects, the collected information (e.g., communication data or vehicle specific data) may periodically (e.g., every x minutes, where x is a whole number, or once a day, or upon availability of a wired or wireless connection) be transmitted from the mobile computing device 106 to the NMC 112 for analysis and record keeping.

The system 200 also includes a data center 212, which may be part of or in communication with NMC 112. The data center 212 illustrates one possible implementation of a central repository for all of the data received from each of the vehicles 104. As an example, as mentioned above many different types of data are transmitted from the vehicles 104 to the NMC 112. In the case where data center 212 is in communication with NMC 112, the data may be transmitted via connection 211 to the data center 212. The connection 211 may comprise any wired or wireless dedicated connection, a broadband connection, or any other communication channel configured to transport the data. Moreover, in an aspect, data center 212 may include one or more back-end servers analyzing the one or more parameters transmitted from the one or more MCP(s) 106. Additionally or alternatively, data may also be exchanged between the plurality of mobile computing devices 106 using, for example, peer-to-peer (P2P) communication without the involvement of the NMC 112.

In some aspect, the data center 212 may include a parking system 108 as described with reference to FIG. 1. The parking system 108 may receive information (e.g., current location of vehicle 104, destination, route, and HOS information of the driver) from the mobile computing device 106. In some aspects, the parking system 108 may further be in communication with a terminal device 125 that may be a user interface portal, a web-based interface, a personal computer (PC), a laptop, a personal data assistant (PDA), a smart phone, a dedicated terminal, a dumb terminal, or any other device over which a user 126, such as a manager or operator responsible for monitoring a fleet of vehicles 104, can view the display or receive a printed report.

As discussed above, the parking system 108 may further include HOS monitoring component 130 for utilizing the information periodically transmitted from the mobile computing device 106 to maintain the driver's on-duty driving hours, on-duty not driving, off-duty, and/or resting periods in order to calculate the remaining available HOS for each driver associated with each vehicle 104. The parking system 108 may further include distance calculation component 135 for calculating the distance that the vehicle 104 may travel prior to the expiration of the available HOS for each driver, where the calculated distance may also be referred to as the target resting destination. Additionally or alternatively, parking system 108 may include parking availability component 140 for identifying parking location candidates at the calculated distance, and forecasting the likelihood of the parking availability at one or more of the parking location candidates. In yet further examples, the data center 212 may include a navigation component 155 in communication with the parking system 108. In some aspects, the navigation component 155 may be configured to transmit navigation information to the mobile computing device 106 in order to navigate the vehicle 104 to the identified parking location and/or available parking space.

In an aspect, the data center 212 may include a data warehouse 214 for receiving the data from vehicles 104 relating to vehicle and/or driver performance (e.g., driver biometric data). In an aspect, for example, data center 212 may include any number of application servers and data stores, where each may be associated with a separate fleet and/or driver management or performance data. In an aspect, each application server and data store may include a processor, memory including volatile and non-volatile memory, specially-programmed operational software, a communication bus, an input/output mechanism, and other operational systems. Each application server may relate to one or more service platforms, such as but not limited to one or more Analytics platforms, one or more Enterprise Services platforms, one or more ROADNET Anywhere platforms, one or more ROADNET Transportation Suite platforms, one or more Sylectus Network platforms, and/or one or more XRS platforms offered by OMNITRACS, LLC of Dallas, Tex. For example, an application server may be a services portal (SP) server that receives, for example, messaging and positioning (M/P) data from each of the vehicles 104. Another application server, for example only, may include one or more servers related to safety and compliance, such as a quick deployment center (QDC) server that receives, for example, critical event (CE) data from each of the vehicles 104. Further, for example, another application server may be vehicle and driver performance data related to fuel usage and/or cost from each of the vehicles 104. Additionally, for example only, another application server may relate to asset management, such as a Vehicle Maintenance and Vehicle Inspection Report server that receives, for example, maintenance and/or inspection data from each of the vehicles 104. It should be understood that the above list of example servers is for illustrative purposes only, and data center 212 may include additional and/or different application servers.

In an aspect, the parking system 108 may be an analysis engine defined by or operating via a processing system 228, for example, connected via a system bus. In an aspect, the processing system 228 includes a processor 232 and a memory 234. In an example implementation, the functionality of HOS monitoring component 130, distance calculation component 135, parking availability component 140, and navigation component 155, as described herein, may be implemented in one or more hardware or firmware processor components of processor 232. For instance, although illustrated as being separate components, communication monitoring component 220 and manager analytics component 224 may be a part of or in communication with processor 232. In another example implementation, the memory 234 can store the routines or functionality, e.g., in the form of computer-readable code or instructions, and/or the corresponding data, that are associated with HOS monitoring component 130, distance calculation component 135, parking availability component 140, and navigation component 155. In an aspect, the processor 232 can execute the stored routines (e.g., code) to implement the functionality of communication monitoring component 220 and manager analytics component 224 that are described herein. Although shown as residing within the data center 212, the processing system 228 may reside elsewhere, and may be implemented as a distributed system in which the processor 232 and the memory 234 may include one or more processor and memories, and may be located in different places, such as at NMC 112 and/or one or more servers associated with NMC 112 or data center 212.

Figure 3:
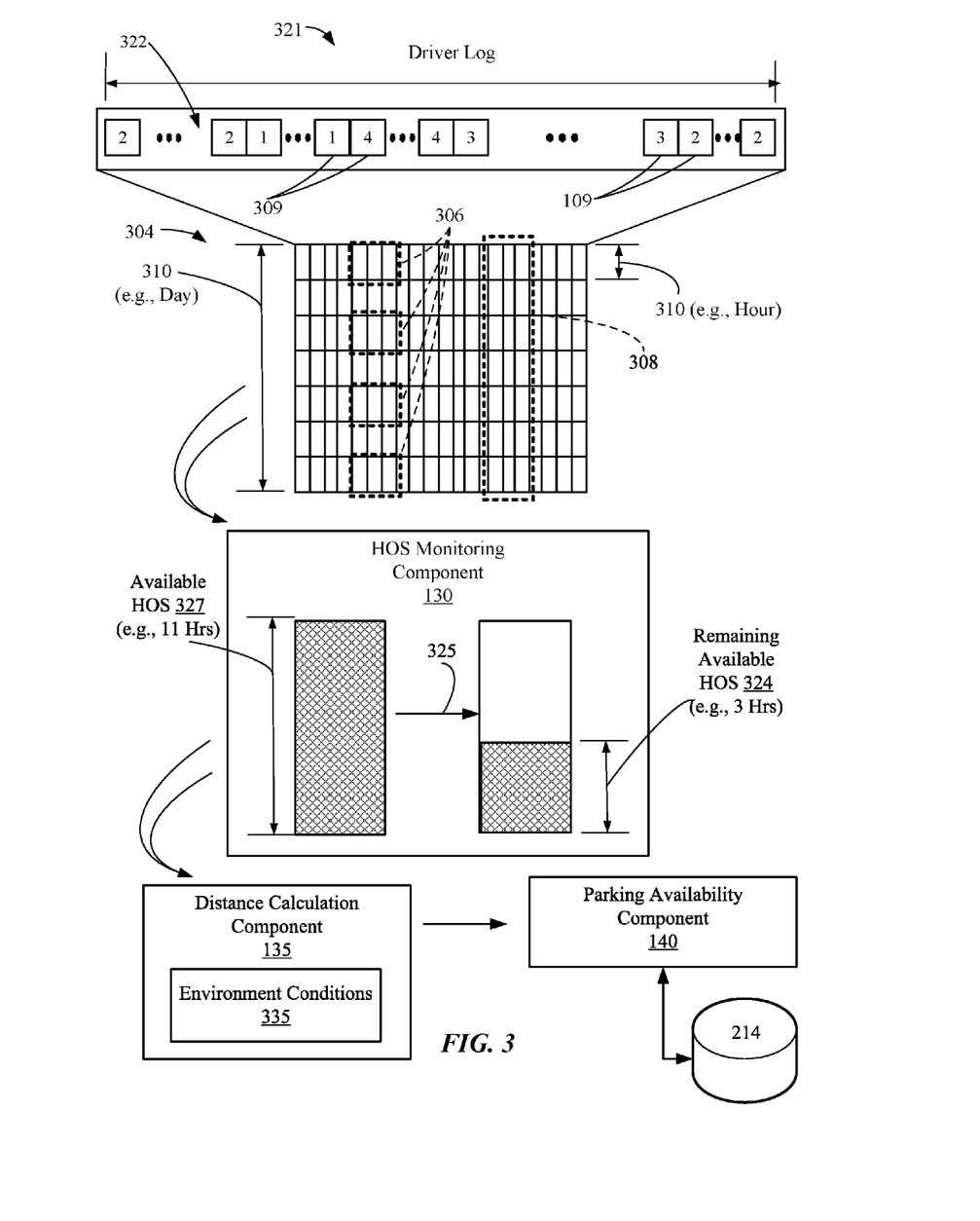
FIG. 3 is a functional block diagram illustrating the analytics system for forecasting parking availability in accordance with various aspects of the present disclosure.

FIG. 3 illustrates one example of the operation of parking system 108 in forecasting parking availability according to various aspects of the present disclosure. In some examples, driver log information 322 includes a combination or sequence of log codes 322 (e.g., 1, 2, 3, 4), where the value of each log code represents a driver state (e.g., log code having a value of: 1=off duty, 2=sleeping, 3=driving, 4=on duty but not driving) for an amount of time associated with each log code 322 (e.g., 1 log code/minute). So, for example, HOS monitoring component 130 associated with parking system 108 may track which log code 322 applies to the driver for, for example, each minute of the day. As such, in one non-limiting example, HOS monitoring component 130 may track the driver log information 321 in a manner that represents the 24 hours in a driver's day 310 as a sequence of log codes (60 log codes/minute×1 minute/hour×24 hours/day), where the sequence corresponds to some combination or sequence of different log code values.

In some aspects, the HOS monitoring component 130 and/or parking availability component 140 may perform in-depth analysis of data 321 associated with each driver (e.g., for a predetermined time period leading up to). For example, the data set 304 may include collected driver log information 322 over a first predetermined time period 310 (e.g., 24-hour period). In some aspects, the HOS monitoring component 130 may apply one or more derivation rules to one or more different time periods or subsets within set 304, including to one or more individual subsets 306 of one or more log codes 322 corresponding to selected time periods in data set 304, as well as to one or more different aggregated subsets 308 of set 304. For instance, the one or more aggregated subsets 308 may include an aggregation such as a summation of the log codes over a time period (e.g., as illustrated but not limited thereto, a daily summation of log codes 1, 2, 3, and 4).

As mentioned above, the NMC 102 may include or be associated with data center 112. The data center 112, in some examples, may further include HOS monitoring component 130, which may be configured to identify the available HOS and remaining HOS 324 associated with the driver. The remaining HOS 324 may be derived based on analysis of driver log information 322 and data set 304. Accordingly, the HOS monitoring component 130 may adjust the remaining available HOS 324 (e.g., by decrementing 325 the available HOS 327) based on aggregate information 308 that may identify total number of hours that the driver may have been on-duty for a consecutive period of time (e.g., 9 hours of driving without rest).

Upon calculating the remaining available HOS 324 associated with the driver, a distance calculation component 135 may calculate a distance that the driver may be able to drive prior to expiration of the remaining available HOS 324. In some aspects, the distance calculation component 135 may utilize the environment conditions 335 (e.g., traffic and/or weather conditions on vehicle's route) to calculate the estimated distance that the driver may driver in order to identify a target resting destination. Additionally or alternatively, the parking availability component 140 may reference the data warehouse 214 to identify parking location candidates and forecast the likelihood of available parking spaces at the parking location candidates for the time period that the vehicle may be estimated to reach the parking location. In some examples, the parking availability component 140 may utilize historical data (e.g., data collected from other vehicles within the fleet), surveyed data (e.g., data gathered from commercial vendors that identify parking availability), and/or real-time parking information (e.g., cameras and parking sensors that may identify whether the parking space is available or occupied).

Figure 4:
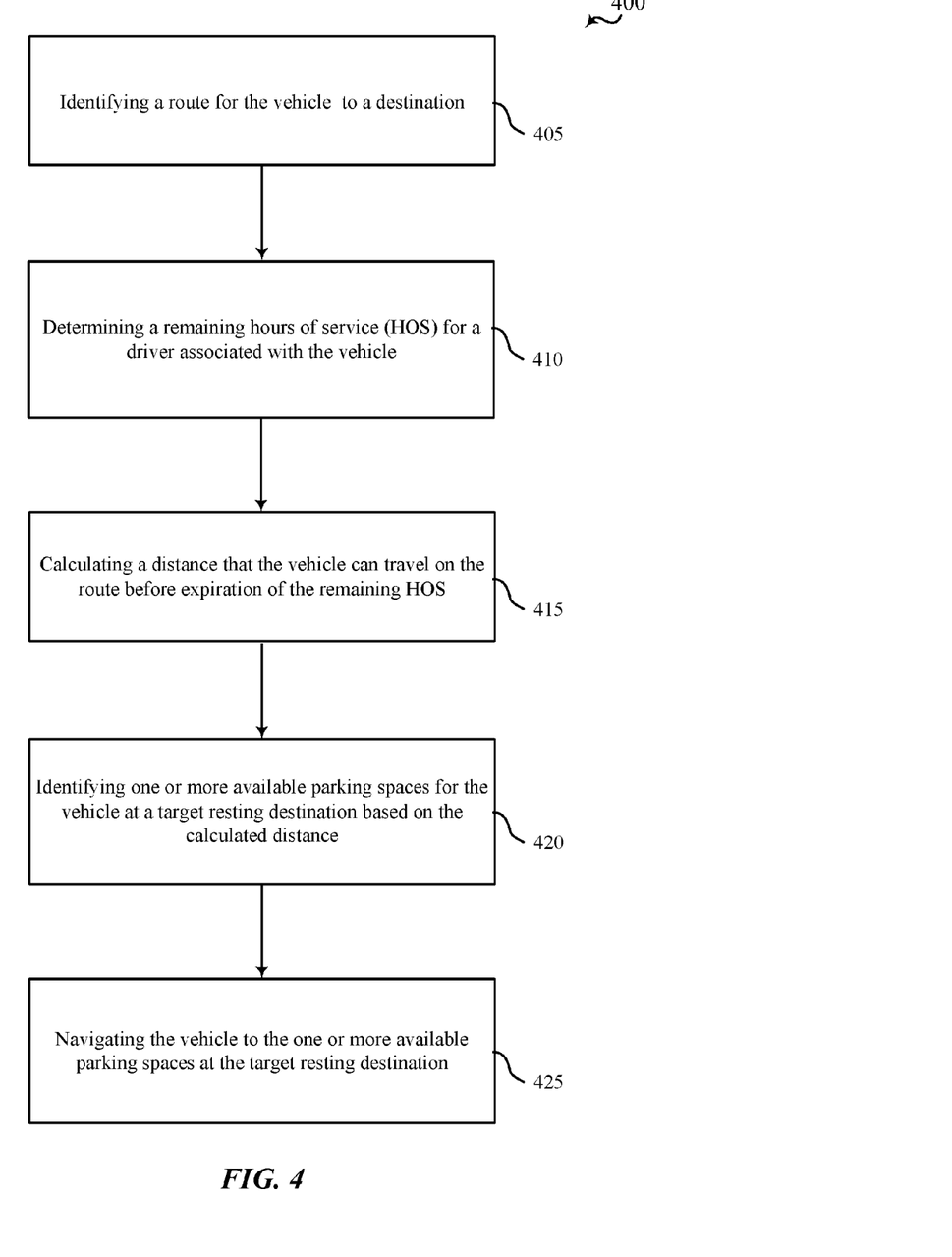
FIG. 4 is a flowchart of an aspect of a method in accordance with the present disclosure.

FIG. 4 illustrates one example of a method 400 of implementing parking forecasting system in accordance with various aspects of the present disclosure. In some aspects, the method 400 may be implemented by the NMC 112 and/or data center 212 described with reference to FIGS. 1-3.

At block 405, the method 400 may include identifying a route for the vehicle to a destination. In some examples, the current location of the vehicle, the final destination, and the streets defining the route that the vehicle may traverse may be periodically transmitted to the NMC 112. Based on the transmitted information, the NMC device 112, and more particularly the parking system 108 (described with references to FIGS. 1-2) may be able to identify the route that the vehicle 104 may take to a destination.

At block 410, the method 400 may include determining a remaining available HOS for a driver associated with the vehicle. In some examples, the remaining available HOS may be determined by maintaining the available HOS information (e.g., 11 hours of allowable driving) associated with each driver, and decrementing the available HOS based on information received from the mobile computing device that indicates that the driver is on-duty and driving. Thus, as the driver continues to drive the vehicle 104, the HOS monitoring component 130 of the parking system 108 may continuously decrement the available HOS associated with the driver such that the HOS monitoring component 130 maintains accurate and real-time information to comply with the state and federal requirements.

At block 415, the method 400 may include calculating a distance that the vehicle can travel on the route before expiration of the remaining available HOS. In some examples, distance calculation component 135, as described with reference to FIGS. 1-2, may calculate the distance that the vehicle may travel in order to identify a target resting destination. In some aspects, the calculated distanced may be determined based on consideration of traffic and weather conditions along the route of the vehicle. For example, if a portion of the vehicle route is experiencing inclement weather (e.g., snow or rain), the distance calculation component 135 may adjust the calculated distance to reflect that the vehicle may travel at lower than normal speeds during the portion of stretch that may be affected by weather conditions.

At block 420, the method 400 may include identifying one or more available parking spaces for the vehicle at a target resting destination based on the calculated distance. In some examples, the parking availability component 140, described with reference to FIGS. 1-2, may identify one or more parking location candidates having one or more available parking spaces at various intervals near the target resting destination. Additionally or alternatively, the parking availability component 140 may also include a confidence factor associated with the identified parking location candidates having one or more available parking spaces at the target resting destination. The parking location candidates may include commercial parking locations, non-commercial parking locations, or a combination thereof.

At block 425, the method 400 may include navigating the vehicle to the one or more available parking spaces at the target resting destination. In some aspects, the navigation component 155 may provide turn-by-turn directions to the vehicle for the driver to follow to the identified available parking space or to the identified parking location candidate having the available parking space.

Figure 5:
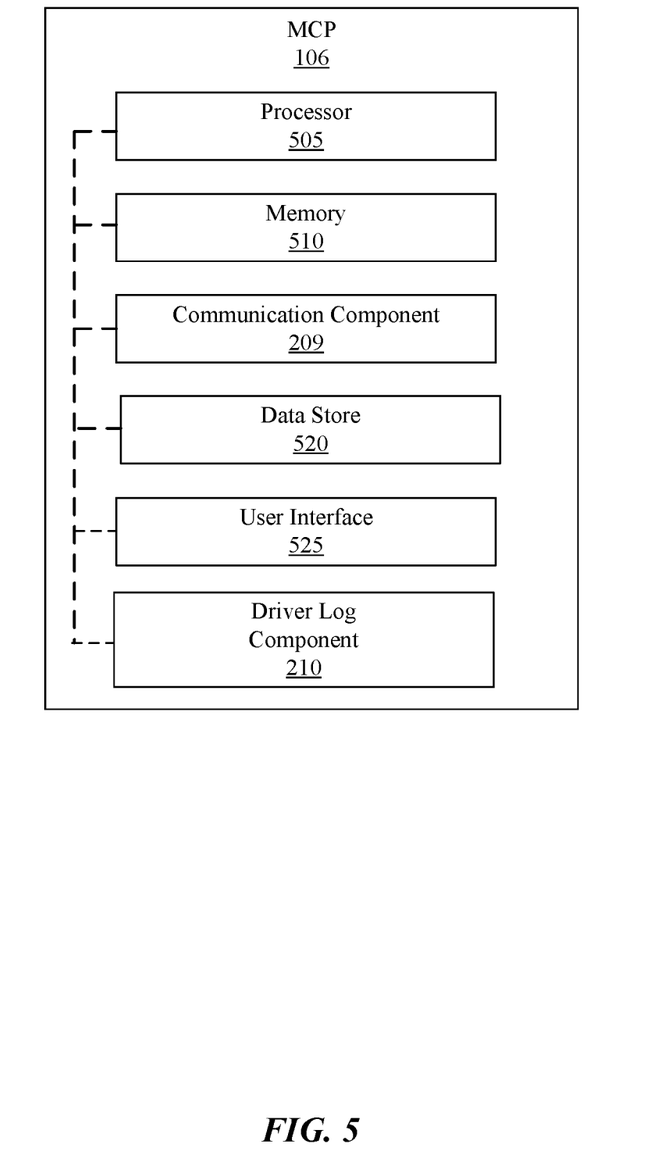
FIG. 5 is a block diagram of an example of an aspect of a mobile computing device in accordance with the present disclosure.

Referring to FIG. 5, in an example that should not be construed as limiting, mobile computing device 106 may include additional components which may be implemented in specially programmed computer readable instructions or code, firmware, hardware, or some combination thereof, in associating with the operation of driver log component 210 and/or communications component 209 describe above.

In an aspect, features described herein with respect to the functions of communication component 209 may be implemented in or executed using one or any combination of processor 505, memory 510, communications component 209, and data store 520. For example, communication component 209 may be defined or otherwise programmed as one or more processor components of processor 505. Further, for example, communication component 209 may be defined as a computer-readable medium (e.g., a non-transitory computer-readable medium) stored in memory 510 and/or data store 520 and executed by processor 505. Moreover, for example, inputs and outputs relating to operations of communication component 209 may provide a bus between the components of computer device or an interface for communication with external devices or components. Processor 505 can include a single or multiple set of processors or multi-core processors. Moreover, processor 505 can be implemented as an integrated processing system and/or a distributed processing system.

Memory 510 may operate to allow storing and retrieval of data used herein and/or local versions of applications and/or software and/or instructions or code being executed by processor 505, such as to perform the respective functions of communication component 209 described herein. Memory 510 can include any type of memory usable by a computer, such as random access memory (RAM), read only memory (ROM), tapes, magnetic discs, optical discs, volatile memory, non-volatile memory, and any combination thereof.

Communications component 209 is operable to establish and maintain communications with one or more internal components/components or external devices utilizing hardware, software, and services as described herein. Communication component 209 may further carry communications between components on mobile computing device 106, as well as between user and external devices, such as devices located across a communications network and/or devices serially or locally connected to mobile computing device 106. For example, communications component 209 may include one or more buses, and may further include transmit chain components and receive chain components associated with a transmitter and receiver, respectively, or a transceiver, operable for interfacing with external devices.

Additionally, data store 520, which can be any suitable combination of hardware and/or software, which provides for mass storage of information, databases, and programs employed in connection with aspects described herein. For example, data store 520 may be a data repository for applications not currently being executed by processor 505.

mobile computing device 106 may additionally include a user interface component 525 operable to receive inputs from a user, and further operable to generate outputs for presentation to the user. User interface component 525 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 525 may include one or more output devices, including but not limited to a display, a speaker, a haptic feedback mechanism, a printer, any other mechanism capable of presenting an output to a user, or any combination thereof.

In some aspects, the mobile computing device 106 may also include a driver log component 210 configured to maintain an on-duty and driving, on-duty not driving, off-duty, and/or resting periods associated with the driver of the vehicle. In some examples, the driver log component 210 may obtain information either via input by the driver (e.g., via user interface) and/or from the sensors associated with the vehicle (e.g., engine or GPS sensors).

Figure 6:
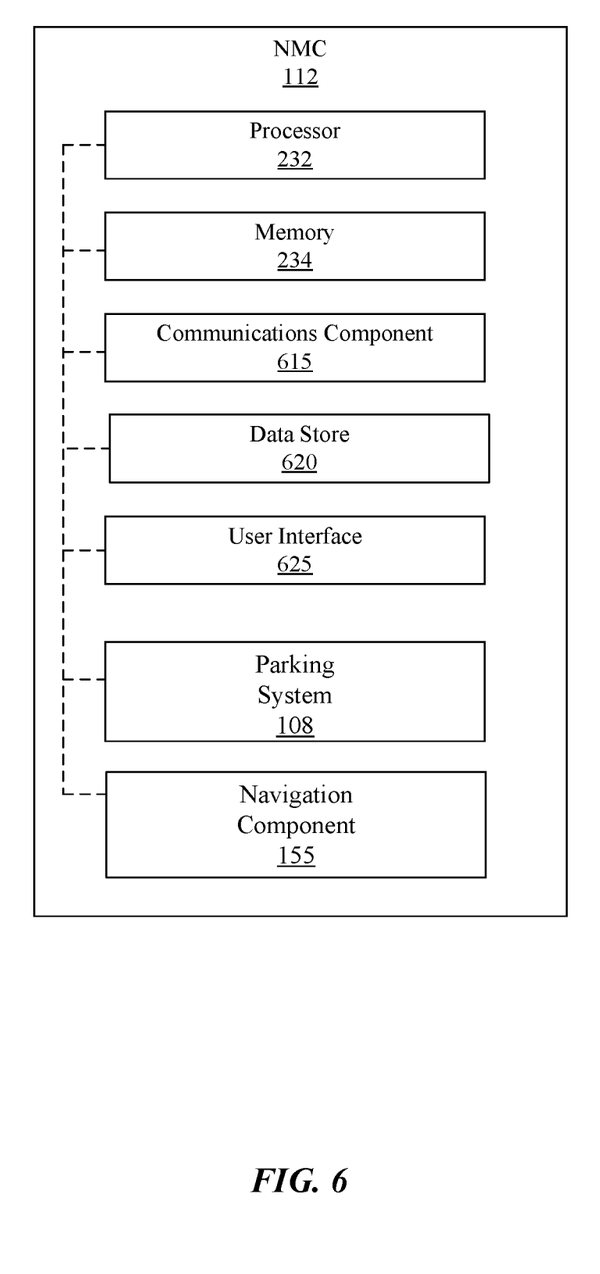
FIG. 6 is a block diagram of an example of an aspect of a network management center (NMC) in accordance with the present disclosure.

Referring to FIG. 6, in an example that should not be construed as limiting, NMC 112 may include additional components for implementing aspects of the present disclosure associated with parking system 108 and/or navigation component 155, which may be implemented in specially programmed computer readable instructions or code, firmware, hardware, or some combination thereof 155

In an aspect, the features of parking system 108 and navigation component 155 described herein may be implemented in or executed using one or any combination of processor 232, memory 234, communications component 615, and data store 620. For example, parking system 108 and navigation component 155 may be defined or otherwise programmed as one or more processor components of processor 232. Further, for example, parking system 108 and navigation component 155 may be defined as a computer-readable medium (e.g., a non-transitory computer-readable medium) stored in memory 234 and/or data store 610 and executed by processor 232. Moreover, for example, inputs and outputs relating to operations of parking system 108 and navigation component 155 may be provided or supported by communications component 615, which may provide a bus between the components/components of NMC 112 or an interface for communication with external devices or components/components.

Processor 232 can include a single or multiple set of processors or multi-core processors. Moreover, processor 232 can be implemented as an integrated processing system and/or a distributed processing system.

Memory 234 may be operable for storing and retrieving data used herein and/or local versions of applications and/or software and/or instructions or code being executed by processor 232, such as to perform the respective functions of the respective entities described herein. Memory 234 can include any type of memory usable by a computer, such as random access memory (RAM), read only memory (ROM), tapes, magnetic discs, optical discs, volatile memory, non-volatile memory, and any combination thereof.

Communications component 615 may be operable to establish and maintain communications with one or more internal components/components and/or external devices utilizing hardware, software, and services as described herein. Communications component 615 may carry communications between components on NMC 112, as well as between user and external devices, such as devices located across a communications network and/or devices serially or locally connected to NMC 112. For example, communications component 615 may include one or more buses, and may further include transmit chain components and receive chain components associated with a transmitter and receiver, respectively, or a transceiver, operable for interfacing with external devices.

Additionally, data store 620, which can be any suitable combination of hardware and/or software, which provides for mass storage of information, databases, and programs employed in connection with aspects described herein. For example, data store 620 may be a data repository for applications not currently being executed by processor 232.

NMC 112 may additionally include a user interface component 625 operable to receive inputs from a user, and further operable to generate outputs for presentation to the user. User interface component 625 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 626 may include one or more output devices, including but not limited to a display, a speaker, a haptic feedback mechanism, a printer, any other mechanism capable of presenting an output to a user, or any combination thereof.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the figures which may illustrate various process flows.

In the above description, the term "software product" may include files having executable content, such as: object code, scripts, byte code, markup language files, and patches. In addition, a "software product" referred to herein, may also include files that are not executable in nature, such as documents that may need to be opened or other data files that need to be accessed.

The term "software update" may also include files having executable content, such as: object code, scripts, byte code, markup language files, and patches. In addition, "software update" referred to herein, may also include files that are not executable in nature, such as documents that may need to be opened or other data files that need to be accessed.

As used in this description, the terms "component," "database," "component," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for navigating a vehicle to one or more parking location candidates, comprising:
    identifying a route for the vehicle to a destination;
    determining a remaining hours of service (HOS) for a driver associated with the vehicle;
    calculating a distance that vehicle can travel on the route before expiration of the remaining HOS;
    identifying the one or more parking location candidates for the vehicle at a target resting destination based on the calculated distance; and
    navigating the vehicle to the one or more parking location candidates at the target resting destination.

2. The method of claim 1, wherein the identifying the route for the vehicle to the destination, comprises:
    receiving, at a network entity, vehicle specific information from a mobile computing platform associated with the vehicle, wherein the vehicle specific information includes a current location of the vehicle, the destination of the route, and the route that the vehicle will traverse to the destination.

3. The method of claim 1, wherein identifying the one or more parking location candidates for the vehicle at the target resting destination, comprises:
    determining parking location candidates based on at least one of a historical data, surveyed data, or real-time parking availability data.

4. The method of claim 3, wherein the historical data is determined based on information collected from a plurality of mobile computing platforms at the target resting destination.

5. The method of claim 1, further comprising:
    reserving a parking space at the one or more parking location candidates.

6. The method of claim 1, further comprising:
    assigning a confidence factor to the one or more parking location candidates; and
    displaying the confidence factor at a display of a mobile computing device associated with the one or more parking location candidates.

7. The method of claim 1, wherein calculating the distance that vehicle can travel on the route before expiration of the remaining HOS is based on traffic or weather conditions on the route.

8. The method of claim 1, wherein the one or more parking location candidates includes one or more available parking spaces.

9. An apparatus for navigating a vehicle to one or more parking location candidates, comprising:
    a processor; and
    a memory, wherein the memory includes instructions executable by the processor to:
    identify a route for the vehicle to a destination;
    determine a remaining hours of service (HOS) for a driver associated with the vehicle;
    calculate a distance that vehicle can travel on the route before expiration of the remaining HOS;
    identify the one or more parking location candidates for the vehicle at a target resting destination based on the calculated distance; and
    navigate the vehicle to the one or more parking location candidates at the target resting destination.

10. The apparatus of claim 9, wherein the processor is further configured to:
    receive, at a network entity, vehicle specific information from a mobile computing platform associated with the vehicle, wherein the vehicle specific information includes a current location of the vehicle, the destination of the route, and the route that the vehicle will traverse to the destination.

11. The apparatus of claim 9, wherein the processor is further configured to:
    determine parking location candidates based on at least one of a historical data, surveyed data, or real-time parking availability data.

12. The apparatus of claim 11, wherein the historical data is determined based on information collected from a plurality of mobile computing platforms at the target resting destination.

13. The apparatus of claim 9, wherein the processor is further configured to:
    reserve a parking space at the one or more parking location candidates.

14. The apparatus of claim 9, wherein the processor is further configured to:
    assign a confidence factor to the one or more parking location candidates; and
    display the confidence factor at a display of a mobile computing device associated with the one or more parking location candidates.

15. The apparatus of claim 9, wherein calculating the distance that vehicle can travel on the route before expiration of the remaining HOS is based on traffic or weather conditions on the route.

16. The apparatus of claim 9, wherein the one or more parking location candidates includes one or more available parking spaces.

17. A computer-readable medium for navigating a vehicle to one or more parking location candidates, comprising instructions executable to:
    identify a route for the vehicle to a destination;
    determine a remaining hours of service (HOS) for a driver associated with the vehicle;
    calculate a distance that vehicle can travel on the route before expiration of the remaining HOS;
    identify the one or more parking location candidates for the vehicle at a target resting destination based on the calculated distance; and
    navigate the vehicle to the one or more parking location candidates at the target resting destination.

18. The computer-readable medium of claim 17, wherein the instructions are further executable to:
    receive, at a network entity, vehicle specific information from a mobile computing platform associated with the vehicle, wherein the vehicle specific information includes a current location of the vehicle, the destination of the route, and the route that the vehicle will traverse to the destination.

19. The computer-readable medium of claim 17, wherein the instructions are further executable to:
    determine parking location candidates based on at least one of a historical data, surveyed data, or real-time parking availability data.

20. The computer-readable medium of claim 19, wherein the historical data is determined based on information collected from a plurality of mobile computing platforms at the target resting destination.

\* \* \* \* \*